Dec. 11, 1934.  W. G. PARKER ET AL  1,984,231
JIG FOR WORKING ON CLUTCHES
Filed Oct. 6, 1933
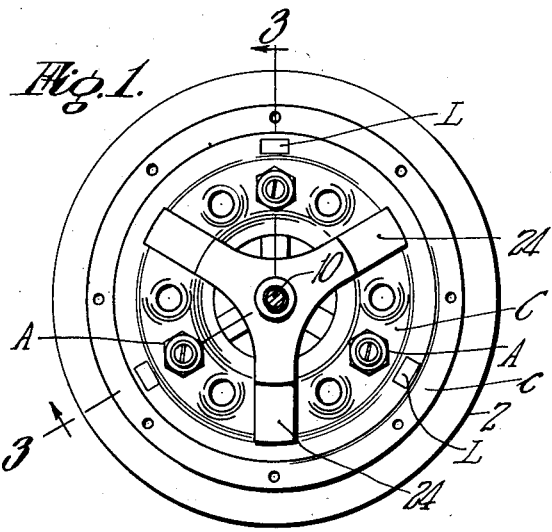
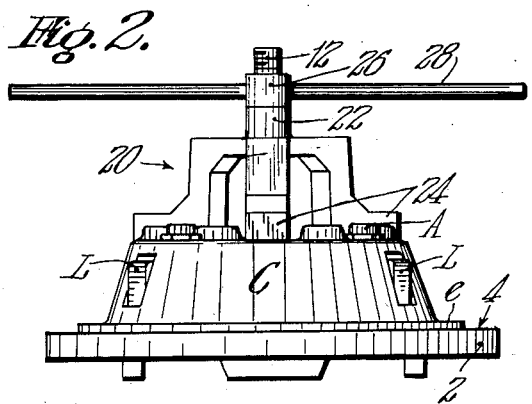
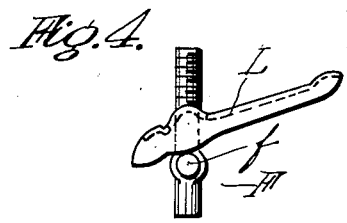
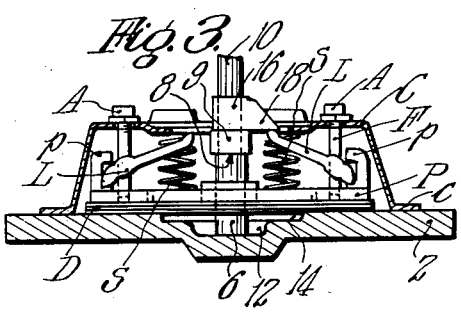
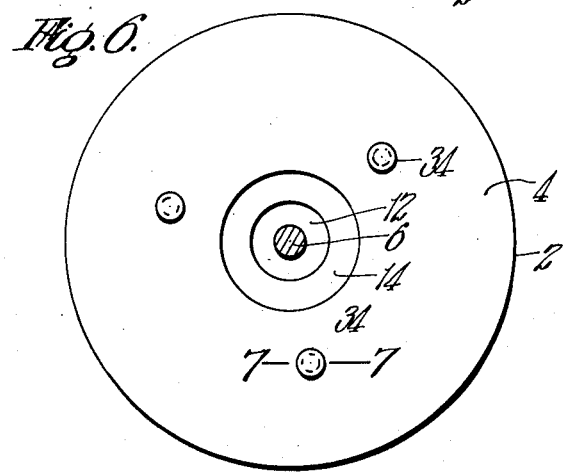
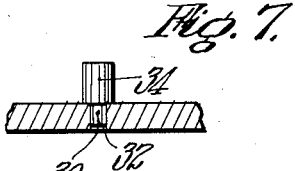
INVENTORS.
Walter G. Parker and
BY Edor E. Bassette.
ATTORNEY.

Patented Dec. 11, 1934

1,984,231

UNITED STATES PATENT OFFICE 1,984,231

JIG FOR WORKING ON CLUTCHES

Walter G. Parker, North Adams, and Edor E. Bassette, Adams, Mass.

Application October 6, 1933, Serial No. 692,478

1 Claim. (Cl. 29—89)

This invention relates to improvements in apparatus for working on automobile clutches and is directed more particularly to improvements in jig apparatus for assembling and disassembling said clutches and for adjusting the same.

The principal objects of the invention are directed to the provision of a novel jig apparatus for automobile clutches and is constructed and arranged to facilitate the ready and easy assembling, dissassembling, and adjustment thereof.

In order to facilitate a clear understanding of the novel features of the invention, we will briefly describe one form of a clutch with which the apparatus may be employed. The clutch to be referred to is known as the single plate dry disc type. This consists generally of a cover more or less in the form of a pan secured to the outer face of the flywheel which encloses the clutch mechanism and with which certain of the parts are assembled. A pressure-plate associated with the cover is spring-pressed toward the face of the flywheel by springs interposed between the pressure-plate and the outer wall of the cover. A plurality of radially disposed swinging release levers are associated with the pressure-plate and have inner free ends adjacent the axis of the clutch assembly. These move the pressure-plate against the action of the springs from engaging to disengaging position.

A driven-plate or disc is disposed between the outer face of the flywheel and pressure plate and is connected to the transmission. The flywheel, cover and pressure-plate are driven by the flywheel. The pressure-plate which is spring-pressed into engagement with the driven-plate causes the latter to engage the face of the flywheel so that the driven-plate and transmission are driven by the flywheel.

A release collar is slidable axially of the clutch assembly and is actuated by the clutch pedal. This collar bears on the inner ends of the levers mentioned so that as the levers are pressed toward the flywheel the pressure-plate is moved against the springs away from the flywheel, thus releasing the driven-plate and so that the flywheel and transmission are disconnected. The levers are mounted for swinging movements on parts associated with the cover and pressure plate and are adjustable to vary the movement of the pressure-plate. Due to the wear of the parts, lever adjustments are necessary in order to insure accurate and uniform action of the levers to bring about proper actuation of the pressure-plate. When the parts are out of adjustment, the clutch slips, grabs and otherwise operates unsatisfactorily.

It is to assemble and disassemble and adjust the parts of clutches of the type referred to that the novel features of this invention relate and as a particular feature of the invention it is possible to readily and easily assemble and disassemble and adjust the parts of clutches as will hereinafter more fully appear.

The various novel features and advantages of the invention will be more fully hereinafter referred to in connection with the accompanying drawing wherein:

Fig. 1 is a plan view of a jig apparatus embodying the novel features of the invention.

Fig. 2 is a side elevational view of the same.

Fig. 3 is a sectional view on the line 3—3 of Fig. 1.

Fig. 4 is an elevational view of one of the release levers of a clutch and its pivot pin.

Fig. 5 is an elevational view showing a plurality of adjusting collars for a gauge forming part of the apparatus.

Fig. 6 is a plan view of the base of the apparatus, and

Fig. 7 is a sectional view on the line 7—7 of Fig. 6.

Referring now to the drawing more in detail, the invention will be fully described.

A base-plate 2 is provided which may be circular in form as shown and which has an upper face 4 that represents the forward, front face of a flywheel which may be called a clutch face. It is relative to this face that certain parts of the clutch are adjusted as will be later explained.

A central spindle has a base 6 which extends upwardly from the base plate 2 and is provided with a shoulder 8 above which is located a reduced part 10 that is threaded at its upper end 12. Concentric depressions 12' and 14 are provided around the spindle base 6 to receive the hubs or other parts of clutch plates and the like which are placed on the base plate.

A gauge member 16 is provided which is slidable on the part 10 of the spindle so as to be removable therefrom and it is also oscillatable thereon for gauging purposes. This gauge has a radially disposed arm 18 as shown. The gauge may rest on the shoulder 8 of the spindle or on a tubular spacer or collar such as 9 or one of the tubular gauge adjusting collars 11, 13 and 15 shown in Fig. 5. The adjusting collars facilitating varying the height of the gauge from the upper face of the plate 2 and locate its lower side at various predetermined distances therefrom. By removing the gauge from the spindle and substituting one of the collars for the other or allowing the gauge to rest on the shoulder 8, it is possible to locate the lower gauging edge of the gauge at some very definite distance from the face of the plate for the purpose which will hereinafter appear.

A clamp member 20 has a hub 22 which is slidable on the spindle and is provided with a plurality of radially and downwardly extending pressure arms 24, as shown. An operating member for exerting pressure on the hub 22 of the clamp may consist of a central hub 26 which has one or more radially extending manually engageable grips 28.

The plate 2 is provided with a plurality of sockets such as 30 in Fig. 7 which receive the shanks 32 of plugs such as 34. Preferably there are a plurality of the sockets and plugs which are insertable in the sockets. The plugs may be used when it is desired to assemble and disassemble a clutch as will appear.

In order to facilitate an understanding of the operation of the apparatus the parts of the clutch shown as associated therewith will now be described.

A driven clutch plate D is shown as resting on the plate just as it would against the outer clutch face of a flywheel. This plate is the one which drives the shaft of the automobile transmission. A cover C, more or less in the form of a disc has a peripheral flange c which is bolted to the clutch face of a flywheel. A pressure plate P rests on the driven plate D. Pins such as F have their lower ends slidable in the pressure plate P and their upper threaded ends extend through the cover and receive adjusting nuts A which on rotation in one direction or the other move the pins F up or down.

Trunnions f are carried by the pins F and release levers L slipped over the pins have sockets, as shown, which receive the trunnions whereby the levers may rock. Inwardly extending ears p of the pressure-plate P overlie the outer ends of the levers L and the inner ends of the levers are free for engagement by an axially movable release collar (not shown) which is movable by the clutch pedal axially of the clutch assembly. As the inner free ends of the levers are depressed the outer ends thereof engage the ears p to move the pressure plate P away from the driven plate against the action of springs S disposed as shown between the pressure plate and cover. When the cover is bolted to the face of the flywheel the springs exert pressure on the pressure plate so that it forces the driven plate against the clutch face of the flywheel. The levers are depressed by the release collar referred to, to overcome the pressure of the springs and thereby move the pressure-plate away from the flywheel so that the parts are out of clutching engagement.

The adjusting nuts A in threaded engagement with the ends of the pins F may be rotated in one direction or the other so that the inner ends of the levers may be adjusted relative to one another and relative to the upper face of the plate 2, which is the equivalent to adjusting them relative to the clutch face of a flywheel.

It will be appreciated that if the distance from the front face of the flywheel to the outer side of the inner end of each lever L is not uniform, that when the release collar is brought into engagement therewith the action of the levers will be non-uniform and that therefor the pressure plate will not be actuated properly. It is to adjust these levers that certain novel features of the invention are directed.

With the driven plate on the upper face of the base plate, as shown, the cover, pressure-plate, and lever assembly are dropped thereonto and then the clamp member 20 is set on the cover, as shown. By means of the operating member, pressure is applied to the cover to bring the flange thereof into contact with the plate 2 just as it is bolted onto the face of the flywheel. The springs S offer considerable resistance but the clamping mechanism overcomes the resistance of the springs and moves the cover to the position shown.

The gauge is then brought into use. Either the gauge will rest on the shoulder 8 of the spindle or on one of the adjusting collars depending on the particular clutch being adjusted. The adjusting nuts A are turned to draw the pins F upwardly or to move them downwardly which raises or lowers the trunnions for the levers L and thereby the inner ends of the levers are raised or lowered until the parts thereof engaged by the release collar are a uniform and proper height or distance from the face of plate 2, as determined by the underside of the gauge which may be swung over one lever and the other.

In this way it is possible to set each lever regardless of the number in a set so that the inner ends of the portions thereof which are engaged by the release collar are all at definite and like distances from the face of the plate, which means they will be at a definite and correct uniform distance from the face of the flywheel so as to be suitably located for the clutch release collar which acts on the levers.

When so uniformly set and engaged by the release collar their action is uniform and the movements of the pressure plate is such that it releases and engages the driven plate evenly throughout its entire friction area. The apparatus not only facilitates the quick and easy adjustment of the levers but insures that the levers are set accurately and uniformly.

The apparatus may not only be used for adjusting as described, but it may be used to assemble and disassemble the parts of a clutch. For this purpose the plugs 34 are utilized and these are inserted in the sockets 30 in the plate 2 provided therefor. The clutch assembly including the cover, pressure-plate and springs is slipped down over the spindle until the pressure-plate P rests on the plug 34 which insures that the the flange c of the cover does not touch the upper face 4 of the plate 2. Then the clamp 20 is dropped into place on the cover and the operating member is rotated to exert pressure on the clamp which forces the cover downwardly to compress the springs S whereby the nuts A may be readily and quickly removed to release the pins F so that the cover and pressure-plate may be separated.

Then, when the operating member and clamp are removed the cover may be withdrawn upwardly from off the spindle thus exposing the upper side of the pressure plate making accessible all the parts associated therewith. In assembling, the cover is forced downwardly so that the nuts F may be screwed onto the pins F which secures the parts of the assembly together.

Various changes and modifications may be made in the form of the invention without departing from the spirit and scope thereof and therefore we prefer to be limited, if at all, by the appended claims rather than by the foregoing description. What we desire to claim and secure by Letters Patent of the United States is:

An apparatus of the class described comprising in combination, a base plate having an upper face against which a clutch assembly having a plurality of adjustable levers may be clamped, a spindle having a main body of certain cross-sectional area extending upwardly from the central part of said base plate and having an upper portion of less cross-sectional area than said body portion to provide a shoulder therebetween, said upper portion of the spindle being threaded, a clamp member slidable on the spindle for bearing on said clutch assembly, screw means on said screw-threaded portion of the spindle for exerting pressure on said clamp member, a gauge having an outwardly extending part integral therewith to which clutch levers may be adjusted, said gauge being slidable and rotatable on said spindle for overlying levers of a clutch assembly or removable from said spindle, and a plurality of space members of different lengths bored to slide over said spindle and rest on said shoulder thereof whereby the said gauge may be supported for rotation so that its outwardly extending part is disposed at various predetermined distances from the upper face of said plate.

WALTER G. PARKER.
EDOR E. BASSETTE.